United States Patent
Choi et al.

(10) Patent No.: US 8,989,305 B2
(45) Date of Patent: Mar. 24, 2015

(54) APPARATUS AND METHOD FOR GENERATING MULTIBAND RADIO FREQUENCY SIGNALS IN MARITIME WIRELESS COMMUNICATION

(71) Applicant: Electronics and Telecommunications Research Institute, Daejeon (KR)

(72) Inventors: Jin-Kyu Choi, Daejeon (KR); Jong-Min Park, Daejeon (KR); Dae-Seung Yoo, Gyeongsangnam-do (KR); Gwang-Ja Jin, Daejeon (KR); Byung-Tae Jang, Daejeon (KR); Dong-Sun Lim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 123 days.

(21) Appl. No.: 13/775,611

(22) Filed: Feb. 25, 2013

(65) Prior Publication Data

US 2013/0343486 A1     Dec. 26, 2013

(30) Foreign Application Priority Data

Apr. 26, 2012   (KR) ........................ 10-2012-0043841

(51) Int. Cl.
*H04L 25/49* (2006.01)
*H04B 1/04* (2006.01)
*H04L 25/06* (2006.01)
*H04B 1/00* (2006.01)
*H04B 1/30* (2006.01)

(52) U.S. Cl.
CPC ........ *H04L 25/061* (2013.01); *H04B 2001/305* (2013.01); *H04B 1/0053* (2013.01)
USPC ........................................ 375/296; 455/114.2

(58) Field of Classification Search
CPC .. H04B 1/0053; H04L 25/061; H04L 27/366; H04L 27/367; H04L 27/368
USPC .......... 375/295, 296, 298, 308, 260; 455/103, 455/63.1, 114.2
See application file for complete search history.

(56) References Cited

U.S. PATENT DOCUMENTS

2005/0238116 A1* 10/2005 Monta ........................... 375/298
2009/0213960 A1* 8/2009 Ikeda et al. ................... 375/296

OTHER PUBLICATIONS

Marcus Windisch et al., "Adaptive I/Q Imbalance Compensation in Low-IF Transmitter Architectures", Vehicular Technology Conference, Sep. 26-29, 2004, pp. 2096-2100, vol. 3.

(Continued)

*Primary Examiner* — Betsy Deppe
(74) *Attorney, Agent, or Firm* — Rabin & Berdo, P.C.

(57) ABSTRACT

Disclosed herein are a method and apparatus for generating multiband Radio Frequency (RF) signals in maritime wireless communication. The apparatus includes a baseband conversion unit, a phase compensation unit, a Direct Current (DC) offset compensation unit, and an RF transmission unit. The baseband conversion unit converts RF signals corresponding to a baseband modulation signal having a negative frequency and a baseband modulation signal having a positive frequency into baseband signals, respectively. The phase compensation unit eliminates the images of multiband signals so as to correspond to the baseband signals. The DC offset compensation unit compensates the baseband modulation signals for DC offsets using the multiband signals from which the images have been eliminated. The RF transmission unit generates the RF signals using the signals which have been compensated for the DC offsets, and sends the RF signals via an antenna.

12 Claims, 7 Drawing Sheets

(56) References Cited

OTHER PUBLICATIONS

Stephen Wu et al., "A 900-MHz/1.8-GHz CMOS Receiver for Dual-Band Applications", IEEE Journal of Solid-State Circuits, Dec. 1998, pp. 2178-2185, vol. 33, No. 12.

Sidney Darlington, "On Digital Single-Sideband Modulators", IEEE Transactions on Circuit Theory, Aug. 1970, pp. 409-414, vol. CT-17, No. 3.

Pankaj Sharma et al., "High Speed Maritime Mesh Network System for e-Navigation", E-navigation underway international conference on e-navigation, 2011, pp. 30-40.

* cited by examiner

| SEA AREA | COMMUNICATION TECHNOLOGY | COVERAGE |
|---|---|---|
| A1 | VHF | SEASHORE (WITHIN 20 TO 30 NAUTICAL MILES) |
| A2 | MF | LITTORAL SEA (WITHIN 100 TO 150 NAUTICAL MILES) |
| A3 | INMARSAT/HF | BETWEEN LATITUDE 70° NORTH AND LATITUDE 70° SOUTH |
| A4 | EPIRB, HF | ENTIRE WORLD |

APPARATUS AND METHOD FOR GENERATING MULTIBAND RADIO FREQUENCY SIGNALS IN MARITIME WIRELESS COMMUNICATION

CROSS REFERENCE TO RELATED APPLICATION

This application claims the benefit of Korean Patent Application No. 10-2012-0043841, filed on Apr. 26, 2012, which is hereby incorporated by reference in its entirety into this application.

BACKGROUND OF THE INVENTION

1. Technical Field

The present invention relates generally to a method and apparatus for generating multiband Radio Frequency (RF) signals in maritime wireless communication and, more particularly, to a method and apparatus for generating multiband RF signals in maritime wireless communication, in which in a maritime wireless communication environment, an RF transmitter compensates for Direct Current (DC) offsets, eliminates image signals, and then generates multiband RF signals.

2. Description of the Related Art

Maritime communication systems include medium frequency (MF), high frequency (HF) and very high frequency (VHF) band communication equipment and communication equipment using satellites in order to perform worldwide maritime communication. A global maritime distress and safety system (GMDSS) based on a communication system in which pieces of communication equipment having a variety of purposes were integrated with each other was introduced at the end of 1990s. Recently, the International Maritime Organization (IMO) is playing a leading role in establishing an E-navigation strategy that is intended to construct an Intelligent Transportation System (ITS) that can accommodate data and multimedia using a maritime automatic identification system (AIS) communication network. Furthermore, the use of wireless local area (WLAN), World Interoperability for Microwave Access (WiMAX) and Radio Frequency Identification (RFID) technologies, reflecting current radio wave technologies, in harbors or on ships is being considered in order to improve maritime communication, and an AIS using the VHF band in conjunction with satellites attracts attention as a maritime infrastructure communication network.

Figure 1:
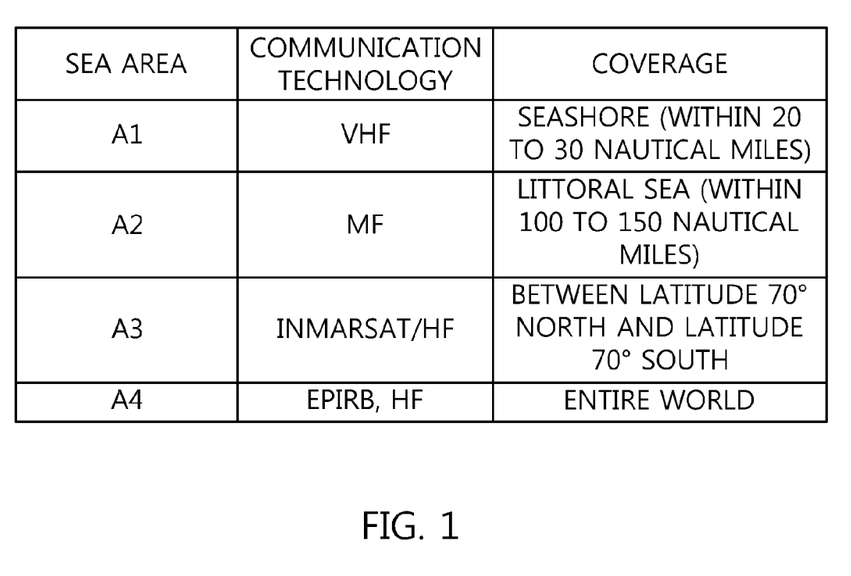
FIG. 1 is a table illustrating the communication technology and coverage for each sea area that was defined by the IMO.

Ships that perform international navigation should be equipped with a variety of types of communication equipment because the ships can communicate with ships on all the seas of the earth. The IMO defined the communication technology and coverage for each of sea areas A1, A2, A3 and A4, as shown in FIG. 1.

Current maritime communication necessitates a variety of types of communication using a plurality of frequency bands, a plurality of pieces of maritime communication means including a GMSDD are present for the band range from the MF band to the VHF band, and, when an ITS will be constructed in the future, maritime communication is also required for the higher frequency bands such as the Ultra High Frequency (UHF) band the super high frequency (SHF) band (see P. Sharma et al, "High Speed Maritime Mesh Network System for e-Navigation," E-navigation underway international conference on e-navigation, Feb. 2, 2011.).

Accordingly, there is a need for a method and apparatus that can improve conventional technology that uses an independent RF transmitter in each frequency band.

SUMMARY OF THE INVENTION

Accordingly, the present invention has been made keeping in mind the above problems occurring in the prior art, and an object of the present invention is to provide a method and apparatus for generating multiband RF signals in maritime wireless communication, in which in a maritime wireless communication environment, an RF transmitter compensates for DC offsets, eliminates image signals, and then generates multiband RF signals so that the multiband RF signals can be sent via two or more frequency bands.

In order to accomplish the above object, the present invention provides an apparatus for generating multiband RF signals in maritime wireless communication, including a baseband conversion unit configured to convert RF signals corresponding to a baseband modulation signal having a negative frequency and a baseband modulation signal having a positive frequency into baseband signals, respectively; a phase compensation unit configured to eliminate images of multiband signals so as to correspond to the baseband signals; a DC offset compensation unit configured to compensate the baseband modulation signals for DC offsets using the multiband signals from which the images have been eliminated; and an RF transmission unit configured to generate the RF signals using the signals which have been compensated for the DC offsets and send the RF signals via an antenna.

The baseband conversion unit may include RF couplers and down-converters, and convert the RF signals into the baseband signals, respectively, using the RF couplers and the down-converters.

The phase compensation unit may eliminate the images of the multiband signals by adjusting the weights of I/Q of RF coupled signals corresponding to the baseband signals.

The RF transmission unit may include a negative frequency up-conversion unit configured to up-convert the baseband modulation signal having a negative frequency and a positive frequency up-conversion unit configured to up-convert the baseband modulation signal having a positive frequency; rate matching units configured to perform matching so that results of the conversion of the negative and positive frequency up-conversion units have a same sampling rate; a signal synthesis unit configured to generate positive and negative frequency signals based on outputs of the rate matching unit; and RF mixers configured to convert the positive and negative frequency signals into RF signals.

The negative and positive frequency up-conversion units may up-convert the corresponding baseband modulation signals into an intermediate frequency in a digital domain.

The baseband modulation signals may correspond to signals that have been digitally modulated using a method such as Quadrature Phase Shift Keying (QPSK) or Quadrature Amplitude Modulation (QAM).

In order to accomplish the above object, the present invention provides a method of generating multiband RF signals in maritime wireless communication, comprising, by an apparatus for generating multiband RF signals in maritime wireless communication, converting RF signals corresponding to a baseband modulation signal having a negative frequency and a baseband modulation signal having a positive frequency into baseband signals, respectively; eliminating images of multiband signals so as to correspond to the baseband signals; compensating the baseband modulation signals for DC offsets using the multiband signals from which the images have been eliminated; and generating the RF signals using the signals which have been compensated for the DC offsets and sending the RF signals via an antenna.

The converting may include converting the RF signals into the baseband signals, respectively, using the RF couplers and down-converters of the apparatus for generating multiband RF signals.

The eliminating may include eliminating the images of the multiband signals by adjusting the weights of I/Q of RF coupled signals corresponding to the baseband signals.

The method may further include, before the converting, up-converting the baseband modulation signal having a negative frequency and the baseband modulation signal having a positive frequency; performing matching so that results of the up-converting have a same sampling rate; generating positive and negative frequency signals based on results of the matching; and converting the positive and negative frequency signals into RF signals.

The up-converting may include up-converting the baseband modulation signal having a negative frequency and the baseband modulation signal having a positive frequency into an intermediate frequency in a digital domain.

The baseband modulation signals may correspond to signals that have been digitally modulated using a method such as QPSK or QAM.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and constructions which have been deemed to make the gist of the present invention unnecessarily vague will be omitted below. The embodiments of the present invention are provided in order to fully describe the present invention to a person having ordinary knowledge in the art. Accordingly, the shapes, sizes, etc. of elements in the drawings may be exaggerated to make the description clear.

A method and apparatus for generating multiband RF signals in maritime wireless communication according to embodiments of the present invention will be described in detail with reference to the accompanying drawings.

The method and apparatus for generating multiband RF signals in maritime wireless communication according to the embodiments of the present invention are based on a multiband transmitter (not shown) that generates RF signals in two frequency bands using a general digital-intermediate frequency (IF) transmitter. Here, the digital-IF transmitter is similar to a two-step transmitter, and refers to a transmitter that performs primary step up-conversion into the IF in the digital domain and then secondary step up-conversion into the RF.

Figure 2:
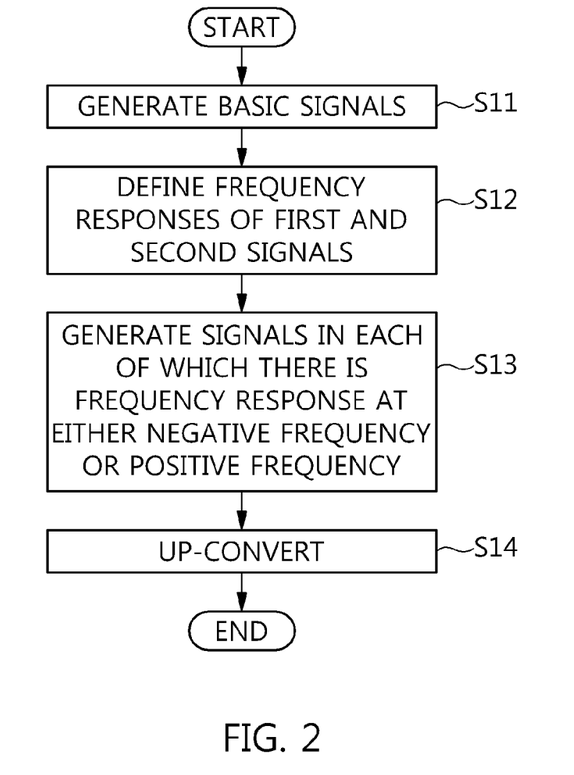
FIG. 2 is a flowchart schematically illustrating a method of generating signals according to an embodiment of the present invention.

FIG. 2 is a flowchart schematically illustrating a method of generating signals according to an embodiment of the present invention. Furthermore, FIGS. 3 and 4 are reference diagrams illustrating the process of generating basic signals in the method of generating signals according to the embodiment of the present invention.

Figure 3:
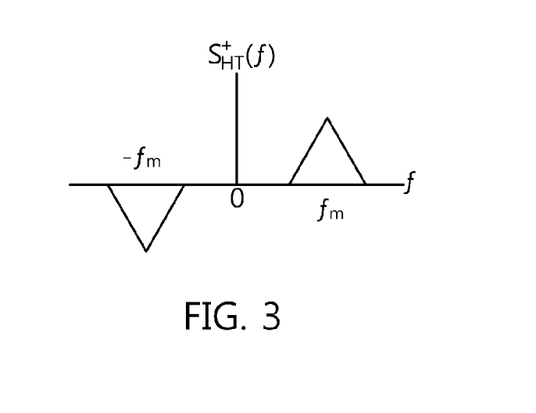
FIGS. 3 and 4 are reference diagrams illustrating the process of generating basic signals in the method of generating signals according to the embodiment of the present invention.
Figure 4:
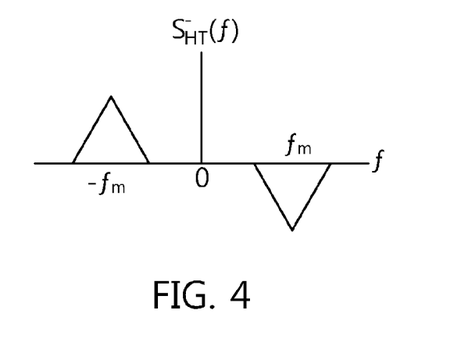

Referring to FIG. 2, a multiband transmitter (not shown) generates a single signal at any IF in the frequency domain as basic signals $S_{HT}^{+}(f)$ and $S_{HT}^{-}(f)$ that have opposite signs at positive and negative frequencies, as shown in FIGS. 3 and 4, at step S11.

Thereafter, the multiband transmitter defines the frequency responses of the basic signals as Equations 1 and 2 at step S12.

$$S_{HT}^{+}(f) = \begin{cases} S_{+}(f), & f > 0 \\ 0, & f = 0 \\ -S_{-}(f), & f < 0 \end{cases} \quad (1)$$

$$S_{HT}^{-}(f) = \begin{cases} -S_{+}(f), & f > 0 \\ 0, & f = 0 \\ S_{-}(f), & f < 0 \end{cases} \quad (2)$$

Figure 5:
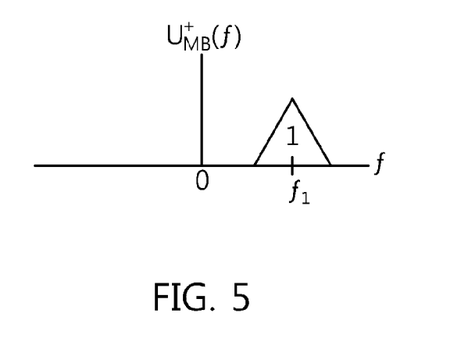
FIGS. 5 to 7 are reference diagrams illustrating the process of defining the frequency responses of basic signals in the method of generating signals according to the embodiment of the present invention.
Figure 6:
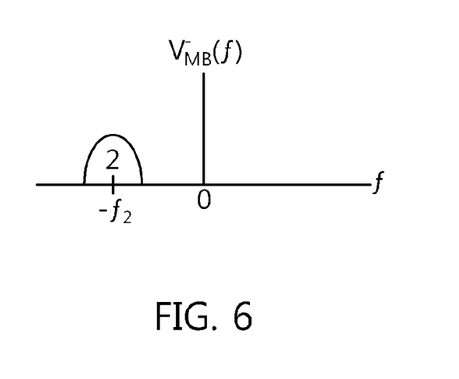

At step S13, the multiband transmitter generates signals in each of which there is a frequency response at either a negative frequency or a positive frequency, as shown in FIGS. 5 and 6, when the basic signals whose frequency responses have been defined at step S12 are added to the frequency response of a source signal. Here, the cases in which the basic signals whose frequency responses have been defined at step S12 are added to the frequency response of the source signal are represented by Equation 3:

$$S_{+}(f) = S(f) + S_{HT}^{+}(f)$$

$$S_{-}(f) = S(f) + S_{HT}^{-}(f) \quad (3)$$

Figure 7:
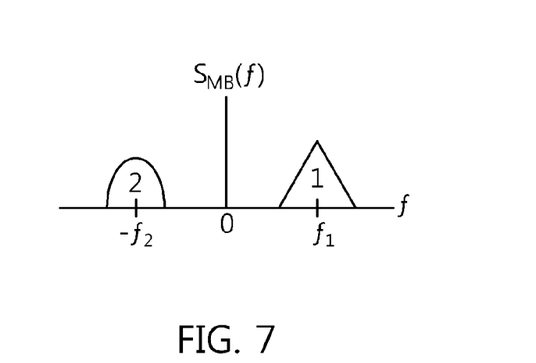

At step S14, the multiband transmitter up-converts the RF signals, as shown in Equations 4 and 5, in order to send information over the signals in each of which there is a frequency response at either a negative frequency or a positive frequency, as shown in FIG. 7.

$$u_{+}(t) = Re[u_1(t)] \cos \omega_b t - Im[u_1(t)] \sin \omega_b t + j\{Re[u_1(t)] \sin \omega_b t + Im[u_1(t)] \cos \omega_b t\} \quad (4)$$

$$v_{-}(t) = Re[v_1(t)] \cos \omega_b t - Im[v_1(t)] \sin \omega_b t - j\{Re[v_1(t)] \sin \omega_b t + Im[v_1(t)] \cos \omega_b t\} \quad (5)$$

The present invention is directed to an apparatus for generating multiband RF signals based on Equations 4 and 5. The apparatus for generating multiband RF signals compensates for DC offsets that occur in the RF signals up-converted at step S14, and eliminates images that occur in the respective bands.

Next, an apparatus for generating multiband RF signals according to an embodiment of the present invention will be described in detail with reference to FIG. 8.

Figure 8:
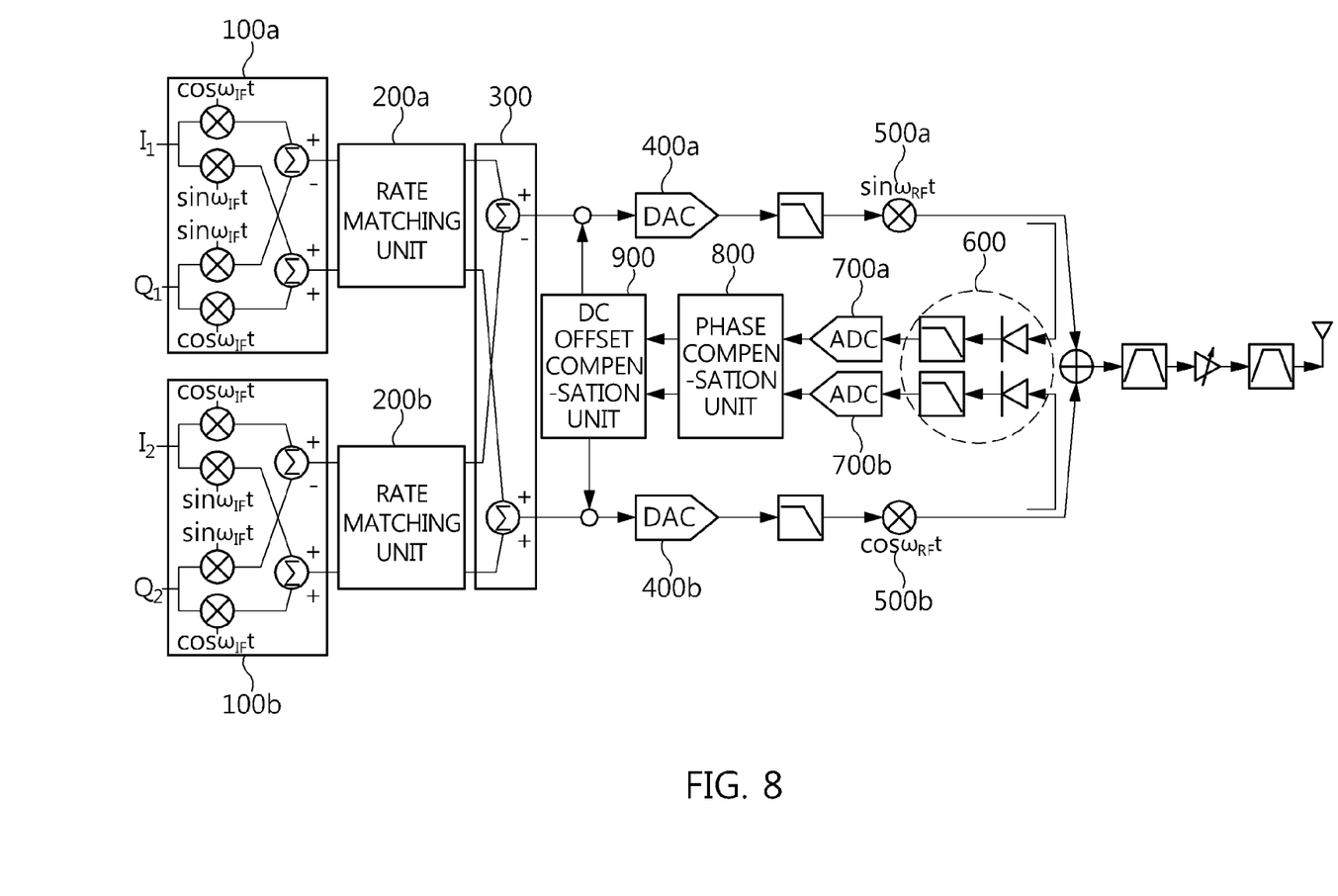
FIG. 8 is a diagram illustrating the configuration of an apparatus for generating multiband RF signals according to an embodiment of the present invention.

FIG. 8 is a diagram illustrating the configuration of the apparatus for generating multiband RF signals according to the embodiment of the present invention.

Referring to FIG. 8, the apparatus for generating multiband RF signals includes negative and positive frequency up-conversion units 100a and 100b, rate matching units 200a and 200b, a signal synthesis unit 300, digital-analog converters ("DACs") 400a and 400b, RF mixers 500a and 500b, a baseband conversion unit 600, analog-digital converters (ADCs) 700, a phase compensation unit 800, and a DC offset compensation unit 900.

The negative and positive frequency up-conversion units 100a and 100b primarily up-convert a baseband modulation signal I1, Q1 having a negative frequency and a baseband modulation signal I2, Q2 having a positive frequency into an IF $W_{IF}$ in the digital domain. Here, the baseband modulation signals that the negative and positive frequency up-conversion units 100a and 100b receive correspond to signals that have been digitally modulated using a method such as QPSK or QAM.

The rate matching units 200a and 200b perform the process of performing matching so that the baseband modulation signals I1, Q1 and I2, Q2 have the same sampling rate when the baseband modulation signals I1, Q1 and I2, Q2 have different sampling rate sampling rates. Here, the process of performing matching corresponds to a general matching method, and thus a description thereof will be omitted here.

The signal synthesis unit 300 generates positive and negative frequency signals by synthesizing the output signals of the rate matching units 200a and 200b.

The DACs 400a and 400b convert the positive and negative frequency signals into analog signals.

The RF mixers 500a and 500b convert the outputs of the DACs 400a and 400b, that is, the analog signals, into RF signals, and output the RF signals to the outside via an antenna.

The baseband conversion unit 600 includes RF couplers and down-converters, and converts the results of the conversion of the RF mixers 500a and 500b, that is, the RF signals, into baseband signals.

The ADCs 700a and 700b convert the outputs of the baseband conversion units 600, that is, the baseband signals, into digital signals.

The phase compensation unit 800 eliminates the images of multiband signals by adjusting the weights of I/Q of RF coupled signals corresponding to the outputs of the ADCs 700, that is, the digital signals.

The DC offset compensation unit 900 eliminates portions corresponding to DC offsets from the positive and negative frequency signals using the outputs of the phase compensation unit 800, that is, the multiband signals from which the images have been eliminated. Thereafter, the DC offset compensation unit 900 inputs the signals from which the portions corresponding to the DC offsets have been eliminated to the DACs 400a and 400b.

As described above, the present invention converts two signals so that they correspond to different frequencies, thereby converting two multi-signals using an oscillator that uses only a single frequency so that they correspond to the IF.

Furthermore, the present invention has the advantage of allowing a single signal to be present in both the negative and positive frequency areas without up-converting two signals in the negative and positive frequency areas, and the advantage of reducing the sampling rate for each given signal bandwidth and spaced frequency to ½ of that of conventional technology that performs conversion to correspond to different frequencies.

Next, a single band transmission process according to an embodiment of the present invention will be described in detail with reference to FIGS. 9 to 12.

FIGS. 9 to 12 are diagrams illustrating a single band transmission process according to an embodiment of the present invention.

Figure 9:
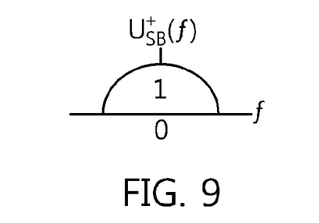
FIGS. 9 to 12 are diagrams illustrating a single band transmission process according to an embodiment of the present invention.

For example, in order to send a single baseband modulation signal via a single band, it is necessary to reduce the sampling rate of a baseband signal, such as that shown in FIG. 9, into ½ and alternately input I1, Q1 and I2, Q2 samples to the apparatus for generating multiband RF signals.

Figure 10:
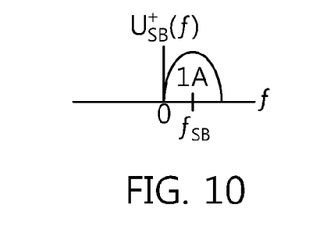
Figure 11:
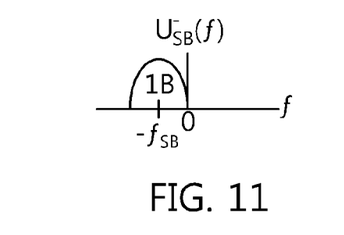

Then the negative and positive frequency up-conversion units 100a and 100b of the apparatus for generating multiband RF signals generate a baseband modulation signal, such as that shown in FIG. 9, into signals, such as 1A of FIG. 10 and 1B of FIG. 11. Here, if the intermediate frequency $W_{IF}$ is set to a small value so as to correspond to the sampling rate, a signal can be disposed near DC, likes signals such as 1A of FIG. 10 and 1B of FIG. 11.

Figure 12:
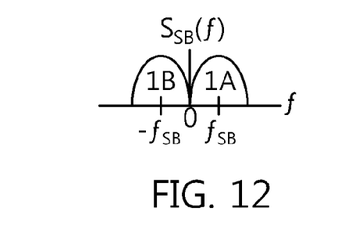

The signals generated as described above, that is, signals such as 1A of FIG. 10 and 1B of FIG. 11, are converted by the DACs 400a and 400b, as shown in FIG. 12.

That is, when the apparatus for generating multiband RF signals according to the embodiment of the present invention generates a single-band signal, the spectrum of a baseband signal such as that shown in FIG. 9 is divided into the positive frequency component of FIG. 10 and the negative frequency component of FIG. 11, and, when the signal synthesis unit 300 adds the components to each other, the sampling rate can be reduced to ½ of the bandwidth of a baseband signal such as that shown in FIG. 9.

Furthermore, when a signal such as that shown in FIG. 12 is input to the multiband transmitter, there is no DC in the signal such as that shown in FIG. 12, and thus the effect of reducing the burden of compensating for DC offsets can be achieved.

Next, a method of generating multiband RF signals will be described in detail with reference to FIG. 13.

Figure 13:
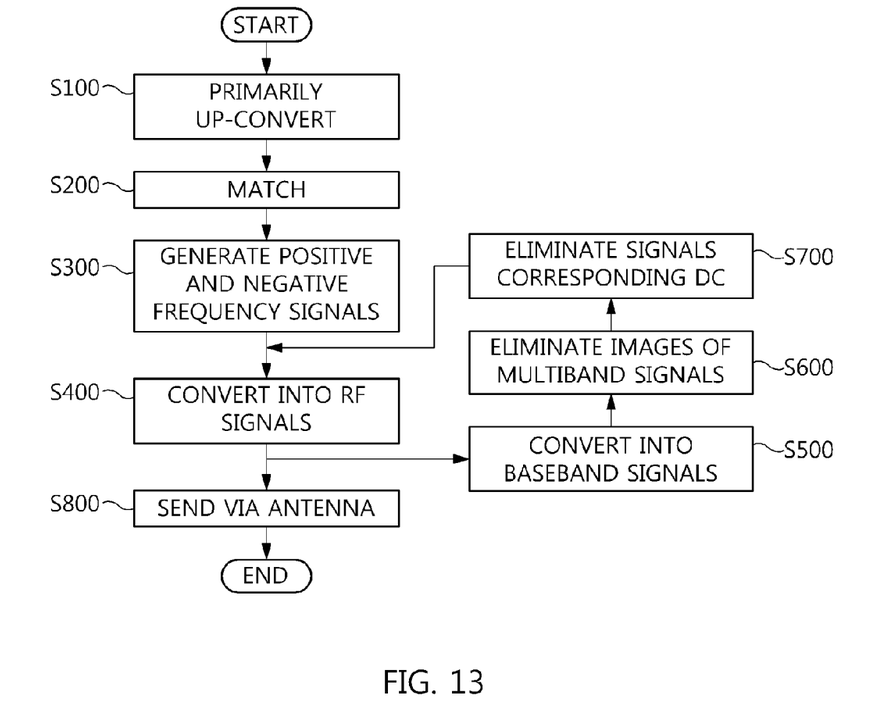
FIG. 13 is a flowchart illustrating a method of generating multiband RF signals according to an embodiment of the present invention.

FIG. 13 is a flowchart illustrating the method of generating multiband RF signals according to an embodiment of the present invention.

Referring to FIG. 13, the apparatus for generating multiband RF signals primarily up-converts received baseband modulation signals I1, Q1 and I2, Q2 into an IF $W_{IF}$ in the digital domain at step S100. Here, the received baseband modulation signals correspond to signals that have been digitally modulated using a method such as QPSK and QAM.

The apparatus for generating multiband RF signals performs the process of performing matching so that the baseband modulation signals I1, Q1 and I2, Q2 have the same sampling rate when the baseband modulation signals have different sampling rates at step S200.

The apparatus for generating multiband RF signals generates positive and negative frequency signals by synthesizing the results of the performance of step S200, that is, the baseband modulation signals having the same sampling rate, at step S300.

The apparatus for generating multiband RF signals converts the positive and negative frequency signals into analog signals and converts the analog signals into RF signals at step S400.

The apparatus for generating multiband RF signals converts the RF signals obtained at step S400 into baseband signals at step S500.

The apparatus for generating multiband RF signals converts the baseband signals obtained at step S500 into digital signals and then eliminates the images of the multiband signals by adjusting the weights of I/Q of RF coupled signals corresponding to the digital signals at step S600.

At S700, the apparatus for generating multiband RF signals eliminates portions corresponding to DC offsets from the multiband signals from which the images have been eliminated at step S600.

At step S800, the apparatus for generating multiband RF signals generates the RF signals of step S400 using the signals which have been compensated for the DC offsets at step S700 and outputs the generated RF signals, that is, multiband RF signals, to the outside via an antenna.

In the method and apparatus for generating multiband RF signals in maritime wireless communication according to the embodiments of the present invention, an RF transmitter, in a maritime wireless communication environment, compensates for DC offsets, eliminates image signals, and then generates multiband RF signals, thereby achieving the following effects.

First, the present invention up-converts a plurality of band signals discontinuously distributed over a plurality of bands into single-IF signals prior to being input to a transmitter, generates signals and then inputs the signals to the transmitter, thereby enabling multiband signals to be sent using only one transmitter.

Second, the present invention can reduce the sampling rate which is used to send signals having a given bandwidth to ½ of that of conventional technology when multiband signals are up-converted into the intermediate frequency.

Third, the present invention can be applied to a single band transmission process, and divides a spectrum corresponding to a specific signal into a plurality of spectra and then regenerates signals in the single band transmission process, thereby reducing the sampling rate which is used for input to a transmitter to ½.

Fourth, the present invention can eliminate the images of multiband signals by adjusting the weights of I/Q of RF coupled signals corresponding to digital signals, and can also compensate for DC offsets.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for generating multiband Radio Frequency (RF) signals in maritime wireless communication, comprising:
a baseband converter unit configured to convert RF signals corresponding to a baseband modulation signal having a negative frequency and a baseband modulation signal having a positive frequency into baseband signals, respectively;
a phase compensator unit configured to eliminate images from multiband signals corresponding to the converted RF signals;
a Direct Current (DC) offset compensator configured to compensate the baseband modulation signals for DC offsets using the multiband signals from which the images have been eliminated; and
an RF transmitter configured to generate the RF signals using the signals which have been compensated for the DC offsets and send the RF signals via an antenna.

2. The apparatus of claim 1, wherein the baseband converter comprises RF couplers and down-converters, and converts the RF signals into the baseband signals, respectively, using the RF couplers and the down-converters.

3. The apparatus of claim 1, wherein the phase compensator eliminates the images of the multiband signals by adjusting weights of I/O of RF coupled signals corresponding to the baseband signals.

4. The apparatus of claim 1, wherein the RF transmitter comprises:
a negative frequency up-converter configured to up-convert the baseband modulation signal having a negative frequency, and a positive frequency up-converter configured to up-convert the baseband modulation signal having a positive frequency;
rate matchers configured to perform matching so that results of the conversion of the negative and positive frequency up-conversion units have a same sampling rate;
a signal synthesizer configured to generate positive and negative frequency signals based on outputs of the rate matchers; and
RF mixers configured to convert the positive and negative frequency signals into the RF signals after the DC offsets have been compensated for.

5. The apparatus of claim 4, wherein the negative and positive frequency up-converters up-convert the corresponding baseband modulation signals into an intermediate frequency in a digital domain.

6. The apparatus of claim 4, wherein the baseband modulation signals correspond to signals that have been digitally modulated using a method such as Quadrature Phase Shift Keying (QPSK) or Quadrature Amplitude Modulation (QAM).

7. A method of generating multiband RF signals in maritime wireless communication, comprising, by an apparatus for generating multiband RF signals in maritime wireless communication:
converting RF signals corresponding to a baseband modulation signal having a negative frequency and a baseband modulation signal having a positive frequency into baseband signals, respectively;
eliminating images from multiband signals corresponding to the converted RF signals;
compensating the baseband modulation signals for DC offsets using the multiband signals from which the images have been eliminated; and
generating RF signals using the signals which have been compensated for the DC offsets and sending the generated RF signals via an antenna.

8. The method of claim 7, wherein the converting comprises converting the RF signals into the baseband signals, respectively, using RF couplers and down-converters of the apparatus for generating multiband RF signals.

9. The method of claim 7, wherein the eliminating comprises eliminating the images of the multiband signals by adjusting weights of I/O of RF coupled signals corresponding to the baseband signals.

10. The method of claim 7, further comprising, before the converting:
up-converting the baseband modulation signal having a negative frequency and the baseband modulation signal having a positive frequency;
performing matching so that results of the up-converting have a same sampling rate; and
generating positive and negative frequency signals based on results of the matching;

wherein the generating the RF signals includes converting the positive and negative frequency signals into RF signals.

11. The method of claim 10, wherein the up-converting comprises up-converting the baseband modulation signal having a negative frequency and the baseband modulation signal having a positive frequency into an intermediate frequency in a digital domain.

12. The method of claim 10, wherein the baseband modulation signals correspond to signals that have been digitally modulated using a method such as QPSK or QAM.

* * * * *